United States Patent Office 3,078,268
Patented Feb. 19, 1963

1

3,078,268
PROCESS FOR THE PREPARATION OF
PENICILLINS
Frank Peter Doyle, 42 Hillside Gardens, Betchworth,
England; John Herbert Charles Nayler, "Coombelea,"
Cliftonville, Dorking, England; and Harry Smith,
"Rockhouse," South Drive, Deepdene, Dorking, England
No Drawing. Filed Oct. 5, 1959, Ser. No. 844,166
3 Claims. (Cl. 260—239.1)

This invention relates to new synthetic compounds of value as antibacterial agents, as nutritional supplements in animal feds, as agents for the treatment of mastitis in cattle and as therapeutic agents in poultry and animals, including man, in the treatment especially of infectious diseases caused by gram-positive bacteria and, more particularly, relates to α-amino-ω-carboxyalkyl penicillins and ω-amino-ω-carboxyalkyl penicillins and nontoxic salts thereof, and a process for their preparation.

Antibacterial agents such as benzylpenicillin have proved highly effective in the past in the therapy of infections due to gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith and are safe for use in patients who cannot be given benzylpenicillin because they exhibit allergic reactions thereto. There is provided, according to the present invention, a member selected from the group consisting of an acid having the formula

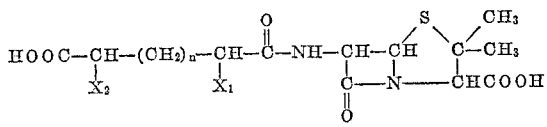

wherein $n$ is an integer from 0 to 3, and $X_1$ and $X_2$ are selected from the group consisting of hydrogen and amino, their values being such that when $X_1$ is hydrogen, $X_2$ is amino, and when $X_1$ is amino, $X_2$ is hydrogen; and nontoxic salts thereof, including nontoxic metallic salts such as sodium, potassium, calcium and aluminum, the ammonium salt and substituted ammonium salts e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula

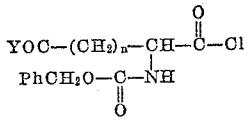

wherein $n$ represents an integer from 1 to 4 and Y represents either a hydroxy or chlorine or its functional equivalent as an acylating agent for a primary amino group and thereafter removing the protecting groups from the amino radicals by hydrogenation under sufficiently mild conditions to avoid destruction of the penicillin nucleus. The protecting group, $PhCH_2OCO$—, in the formula above may, of course, be replaced by other functionally equivalent protecting groups as set forth below. The functional equivalents of the acid chloride set forth above include the corresponding carboxylic acid bromides, acid anhydrides and mixed anhydrides with other carboxylic acids, including monoesters, and particularly lower aliphatic esters, of carbonic acid.

The protected amino acids are preferably prepared by the method described in Example 1 below, which method is also discussed in "A Textbook of Biochemistry" by P. H. Mitchell, at page 113. In the next step the 6-aminopenicillanic acid can be reacted with a mixed anhydride prepared by reacting the amino-substituted carboxylic acid, or a salt thereof, having its group protected, with an ester of chlorocarbonic acid, e.g., ethyl chlorocarbonate. Alternatively, the protected amino-substituted carboxylic acid can be converted to a reactive acid halide.

The several methods used to form the aminoacyl derivative of 6-aminopenicillanic acid (in which the amino group of the amino acid is protected) are standard procedures employed in peptide synthesis and include the use of a reactive acid azide or a carbodi-imide reagent cf. Sheehan and Hess, J. Amer. Chem. Soc., 1955, 77, 1067. The subsequent removal of the protecting groups to form the desired penicillin is effected by catalytic hydrogenation. Suitable protecting groups are of the general formula $R''O.C$—, where $R''$ is an alkyl, benzyl (as shown in the formula above), substituted benzyl, phenyl or substituted phenyl group, or the trityl group $Ph_3.C$—. The abbreviation "Ph" as used herein represents the phenyl group.

Thus, an elegant procedure for preparing protected-aminoacyl derivatives of 6-aminopenicillanic acid by way of a mixed anhydride with ethoxy or isobutoxy-carbonic acid comprises mixing 0.01 mole of an acid having its amino groups protected (whose acid chloride is set forth above), 0.01 mole isobutyl chloroformate and 0.011 mole tertiary hydrocarbonyl or aliphatic amine such as triethylamine in an anhydrous, inert, and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$ and the carbobenzoxy groups protecting the amino groups are removed by hydrogenation. The product in its free acid form is then converted to any desired metal or amine salt by treatment in an appropriate solvent, e.g., ether, with the appropriate base, e.g., a free amine such as procaine base or a solution of potassium 2-ethylhexanoate in dry n-butanol. These salts are usually insoluble in solvents such as ether and can be recovered in pure form by simple filtration.

The removal of the protecting groups is effected by allowing the protected aminoacyl derivatives of 6-aminopenicillanic acid to react with hydrogen in the presence of a catalyst. This hydrogenation is normally carried out at room temperature and at atmospheric pressure, the pH of the reaction mixture being from 5 to 9. The solvent for the hydrogenation reaction is normally water, but other nonreducible solvents such as ethyl alcohol or dioxane or mixtures of these with water may be employed. The preferred hydrogenation catalyst is palladium but other catalysts such as platinum or rhodium may be used. The catalyst is preferably employed on an inert support, e.g., of barium carbonate or carbon. Since the carbon atom next to that carrying the carbobenzyloxyamino group to be reduced is of an aliphatic nature, in order to effect complete reduction it may be necessary to hydrogenate in the presence of two or more successive lots of catalyst.

Another method of preparing an etheral solution of the acid form of the carbobenzoxy derivative of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This etheral extract is dried, as with anhydrous sodium sulfate, and the drying agent is removed to leave a dry etheral solution from which the product is easily isolated, preferably in the form of an ether-insoluble salt such as the potassium salt and the protecting groups are then removed from the amino groups by hydrogenation as described above. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases.

At the conclusion of the foregoing reaction, the products in which the amino groups are protected are isolated, if desired, by the techniques used with benzylpenicillin and phenoxymethylpenicillin. Thus, the product can be extracted into diethyl ether or n-butanol at acid pH and the recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and then to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared according to Batchelor et al., (Nature 183, 257–258, January 24, 1959) or Belgian Patent 569,728. It is used in the above reactions as the salt of a metal or a tertiary hydrocarbonyl amine or as an ester of a hydrocarbonyl alcohol.

Hydrocarbonyl alcohols and tertiary hydrocarbonyl amines are compounds having the formulae $$R-OH \text{ and } R_3-\underset{\underset{R_1}{|}}{N}-R_2$$

wherein the R groups contain only the elements carbon and hydrogen.

The following examples will serve to illustrate this invention without limiting it thereto.

EXAMPLE 1

A solution of N-carbobenzyloxy-DL-α-aminoadipic acid (0.01 mole), which is prepared by reacting benzoxycarbonyl chloride with DL-α-aminoadipic acid, and triethylamine (0.01 mole) in dry acetone is stirred and cooled to approximately −5° C. A solution of ethyl chlorocarbonate (0.02 mole) in dry acetone is added dropwise and the cooling and stirring is continued. The resulting acylating mixture is cooled to approximately −5° C. and is added slowly to a stirred ice cold mixture of 6-aminopenicillanic acid (0.01 mole), 3% sodium bicarbonate (0.01 mole) and acetone. The reaction mixture is brought to room temperature, is stirred for 30 minutes and is then extracted with ether. The extracted aqueous solution is covered with butanol and acidified (pH=2) with N hydrochloric acid. The acidified aqueous solution is extracted twice with butanol. The combined butanolic solutions are washed with water and are then shaken with water to which sufficient 3% sodium bicarbonate solution is added to bring the aqueous phase to pH 7. The combined aqueous solutions are washed with ether and are then evaporated at low temperature and reduced pressure to obtain the crude mixed sodium salts of α and δ-carbobenzlyoxyamino-δ-carboxybutyl penicillins.

EXAMPLE 2

A suspension of palladium on barium carbonate (10.0 grams, of 30%) in water (200 ml.) is shaken in an atmosphere of hydrogen at room temperature and atmospheric pressure for two hours. After this treatment the catalyst is collected and washed with water. The mixed sodium salts of α- and δ-carbobenzyloxy-amino-δ-carboxybutyl penicillin (9.0 grams of 55% purity) is reduced with three successive 10 gram quantities of pretreated palladium on barium carbonate catalyst at pH 8.0 according to the following procedure. The mixed sodium salts are added to an aqueous suspension of the pretreated catalyst and the pH adjusted to 8.0 with 3% sodium bicarbonate solution. This mixture is then shaken under hydrogen at room temperature and atmospheric pressure for 45 minutes. At the end of such hydrogenation, the catalyst is filtered, washed with water and the filtrate, after adjusting to pH 7.0 with N hydrochloric acid, is evaporated to dryness under reduced pressure at a temperature below 20° C. The product (7.0 grams, 82% yield), which inhibited *Staph. aureus* at a concentration of 5.0 mcg./ml., assayed for a purity of 42% and was shown by paper chromatography to contain two zones of antibacterial activity, one of which corresponded closely with that of Cephalosporin N, δ-amino-δ-carboxybutyl penicillin. The other slightly faster running zone was acid stable and is the other isomer, α-amino-δ-carboxybutyl penicillin.

EXAMPLE 3

The replacement of N-carbobenzyloxy-α-aminoadipic acid in the process of Example 1 by 0.01 mole of N-carbobenzyloxy-α-aminosuccinic acid, N-carbobenzyloxy-α-aminoglutaric acid, and N-carbobenzyloxy-α-aminopimelic acid, respectively, results in the formation of the following: α and β-N-carbobenzyloxy-β-carboxyethyl penicillin, α and γ-N-carbobenzyloxy-γ-carboxy-propyl penicillin, and α and ε-N-carbobenzyloxy-ε-carboxypentyl penicillin.

EXAMPLE 4

When the process of Example 2 is repeated using, in place of α and δ-carbobenzyloxyamino-δ-carboxybutyl penicillin, the following compounds, α and β-N-carbobenzyloxy-β-carboxyethyl-penicillin, α and γ-N-carbobenzyloxy-γ-carboxypropyl penicillin, and α and ε-N-carbobenzyloxy-ε-carboxypentyl penicillin, respectively, results in the formation of the following: α-amino-β-carboxyethyl penicillin, β-amino-β-carboxyethyl penicillin, α-amino-γ-carboxypropyl penicillin, γ-amino-γ-carboxypropyl penicillin, α-amino-ε-carboxypentyl penicillin, and ε-amino-ε-carboxypentyl penicillin.

EXAMPLE 5

δ-Amino-δ-carboxybutylpenicillin was obtained by hydrogenating the sodium salt of δ-carbobenzyloxyamino-δ-carboxybutylpenicillin (500 mg., 30% pure) in water at pH 8 in the presence of three successive 500 mg. portions of pretreated palladium on barium carbonate catalyst as in Example 2. The final yield of pale yellow deliquescent solid was 131 mg. Paper chromatography showed only one antibiotic with a considerably different $R_F$ value from the starting material, but with the same $R_F$ value as natural δ-amino-δ-carboxybutylpenicillin (Cephalosporin N) produced by fermentation.

The sodium salt of δ-carbobenzyloxyamino-δ-carboxybutylpencillin, was prepared as follows. DL-δ-carbobenzyloxyamino-δ-carboxyvaleryl hydrazide, M.P. 135–137° (1.34 g.), prepared by the method described by Abraham and Newton (Biochem. J., 1954, 58, 266) for the D-isomer, was dissolved in 0.5 N. hydrochloric acid (34 ml.) and stirred with ethyl acetate (24 ml.) at 0° whilst a solution of sodium nitrite (0.48 g.) in water (4 ml.) was added dropwise during 10 minutes. The mixture was stirred for a further 10 minutes and then the ethyl acetate layer (which contained DL-δ-carbobenzyloxyamino-δ-carboxyvaleryl azide) was separated, washed with water, and added slowly to an ice-cold stirred solution of 6-aminopenicillanic acid (0.94 g., 85% pure) and sodium bicarbonate (1.5 g.) in water (16 ml.). The mixture was stirred for 2 hours, then the ethyl acetate layer was separated and discarded. The sodium salt of δ-carbobenzyloxyamino-δ-carboxybutylpenicillin was then isolated from the aqueous solution by the general procedure of Example 1.

*Preparation of 6-Aminopenicillanic Acid*

The intermediate 6-aminopenicillanic acid is isolated after removal of the natural penicillins from penicillin fermentation broths prepared without the use of added precursors such as phenylacetic acid. For this purpose, suitable penicillin-producing moulds include species of Penicillium, for example *Penicillium chrysogenum* 5120C, and the members of the notatum chrysogenum group. The mould is grown preferably under aerobic submerged conditions, the culture medium used can be one of the generally accepted media commonly used in the preparation of penicillins. The culture medium usually consists essentially of a carbohydrate nutrient material, for example, glucose or lactose; calcium carbonate, sodium sulphate, and a nitrogenous material capable of providing the nitrogen necessary for the growth of the mould. The nitrogenous material can be either a natural substance, for example, peanut meal, or it can be one or more chemical compounds containing nitrogen, for example, ammonium salts such as ammonium lactate or ammonium acetate. Where one or more chemical compounds are used as the nitrogenous material it is usual to incorporate in the culture medium very small amounts of a number of metals such as calcium, iron, zinc, copper, magnesium and manganese and these are normally introduced in the form of an aqueous solution of their salts. A suitable culture medium containing ammonium salts as the nitrogenous material is described by Jarvis and Johnson, J.A.C.S., 69, 3010, (1947), and J. Bact. 59, 51 (1950). Natural nitrogenous materials such as peanut meal usually contain sufficient amounts of suitable inorganic salts and thus when such materials are used in the culture medium it is usually not necessary to make a separate addition of inorganic salts.

The fermentation conditions used in the preparation of the fermentation liquor used in this invention can vary between wide limits, but it has been found preferable to use conditions similar to those commonly used in the preparation of Penicillin G. The temperature employed is preferably one from 20° C. to 35° C. and very satisfactory results have been obtained using a temperature of 25–27° C. The time required for the fermentation depends upon the culture medium and the mould used and the temperature at which the fermentation is carried out. Normal fermentation times are from 48 to 120 hours. The progress of the fermentation can be followed by means of periodic assay.

The fermentation liquor is obtained most satisfactorily when the fermentation is carried out under highly aerobic conditions. In the small scale operations referred to in the examples of this specification, aerobic conditions were achieved by shaking the fermentation mixture on a rotary shaking machine. When working on a larger scale, aerobic conditions can conveniently be obtained either by bubbling air or oxygen through the fermentation mixture, or by rapidly stirring the fermentation mixture. If desired, a combination of stirring and the bubbling of air or oxygen can be used.

It is sometimes preferred to prepare the antibiotic substances by the use of the isolated 6-aminopenicillanic acid or one of the intermediate concentrates obtained during its isolation. A concentrated solution of 6-aminopenicillanic acid can be prepared by evaporating the clarified harvest brew at reduced temperature and pressure to a small volume. If desired, the penicillins present in the brew can be largely removed by extraction with an organic solvent such as butyl acetate at an acid pH. After neutralizing the liquid substantial amounts of impurities can then be precipitated by the addition of solvents such as acetone, methanol or ethanol. After separating such impurities the clear liquor may then be further concentrated to give a concentrated preparation.

The production by the process of this invention of antibiotic material from fermentation liquor having little or no antibiotic activity is clearly indicated if, before the addition of one of the chemical reagents hereinbefore specified to the fermentation liquor, the penicillins already present as a result of the fermentation reaction by which the fermentation liquor was obtained are removed. This removal can readily be achieved as indicated above by extracting the penicillins from the acidified fermentation liquor by means of an organic solvent, for example, butyl acetate, in which the penicillins are soluble.

Thus, 6-aminopenicillanic acid was prepared and isolated as follows:

(a) A strain of *Penicillium chrysogenum* 5120C (obtained from Professor E. B. Chain, Istituto Superiore di Sanita, Roma) was first grown on a glycerol-molasses agar slope for 7 days at 26° C. Sterile distilled water was then added and the spores washed off the surface of the culture to produce a spore suspension. About 10 mls. of this suspension were used to inoculate 5 litres of seed medium in a 10-litre stainless steel stirred fermenter. The seed medium contained 8% w./v. corn steep liquor, 6% w./v. of dextrin and tap water, the pH being adjusted to 6.1 before sterilizing the fermenter and its contents. The tank was stirred at 500 r.p.m. with an air flow of 1 vol./vol./min. and maintained at 27° C. for 48 hours. A volume of 3.2 litres of the contents of this fermenter was then transferred aseptically into a 90-litre stainless steel fermenter containing 50 litres of fermentation medium consisting of peanut meal 3.0% w./v., lactose 4.0% w./v., $Na_2SO_4$ 0.1% w./v., $CaCO_3$ 1.0% w./v. and tap water. The pH was adjusted to 7.2 before the fermenter and its contents were sterilized. After inoculation the tank was maintained at 26–28° C. for 4 days and stirred at 600 r.p.m. by means of an impeller of 12.5 cms. diameter. Air bubbled through the tank at the rate of 1 vol./vol./min. Foaming was controlled by the periodic addition of lard oil containing 2% of octadecanol.

The brew obtained was clarified and 40 litres thereof was concentrated in vacuo to a volume of 4 litres. The pH was then adjusted to 3.0 and the precipitate which formed was removed by centrifuging and the clear liquor was extracted once with half its volume of butyl acetate. The aqueous phase was separated and the pH adjusted to 7.5. 3 vols. of acetone was then added with stirring and the precipitate removed by centrifuging. The clear liquor was then concentrated to 2280 mls. and the pH adjusted to 7.0. It had a potency of 54 $\mu$/mgm. assayed as described below.

The 6-aminopenicillanic acid was assayed by reacting a sample with phenylacetyl chloride and assaying the penicillin found by the cup plate method described by N. G. Heatley in Biochem. J., 38, 61 (1944) using *B. subtilis* as the bacterium. The purity of the preparation can then be expressed in units per mgm. ($\mu$/mgm.) of dry substance.

The potency of pure 6-aminopenicillanic acid assayed by this method is 2750 $\mu$/mgm.

(b) 1200 mls. of the concentrate of potency 54 $\mu$/mgm. were percolated through 200 gms. of Dowex I resin conditioned with hydrochloric acid. The column was washed with water and this wash was combined with the percolate. The assay of this solution proved it to contain 15% of the 6-aminopenicillanic acid applied. The column was then eluted with 0.05 N hydrochloric acid. The pooled active fractions of the eluate contained 81% of the original 6-aminopenicillanic acid, the solution assaying at 900 $\mu$/mgm. The eluate was then adjusted to pH 6.0 and concentrated to 25 mls. in vacuo, concentrated hydrochloric acid was added with stirring to bring the pH to 4.3 and the crystalline 6-aminopenicillanic acid then filtered off and washed with water followed by acetone, and then dried in vacuo. The yield was 1.0 gm. assaying at 2200 $\mu$/mgm. (80%) pure. Repeated precipitation of the crystalline material from neutral aqueous solution by the addition of hydrochloric acid gave a white crystalline solid of melting point 209–210° C. assaying at 2740 $\mu$/mgm. analyzing as follows: (Found: C, 44.6; H, 5.7; N, 13.1; S, 14.1%. $C_8H_{12}O_3N_2S$ requires: C, 44.4; H, 5.6; N, 13.0; S, 14.8%.)

We claim:

1. A process for the preparation of a member of the group consisting of $\alpha$-amino-$\omega$-carboxyalkylpenicillins and $\omega$-amino-$\omega$-carboxyalkylpenicillins which comprises the steps of (1) contacting an $\alpha$-amino-$\omega$-carboxyalkanoic acid with benzoxycarbonyl chloride, (2) isolating the $\alpha$-carbobenzyloxy-amino-$\omega$-carboxyalkanoic acid so formed, (3) contacting said $\alpha$-carbobenzyloxyamino-$\omega$-carboxyalkanoic acid with a lower aliphatic ester of chlorocarbonic acid to form the corresponding anhydride, (4) isolating said anhydride so formed, (5) contacting said anhydride with 6-aminopenicillanic acid to form the corresponding carbobenzyloxyamino-$\omega$-carboxyalkylpenicillin, (6) isolating the carbobenzyloxyamino-$\omega$-carboxyalkylpenicillin so formed, (7) contacting said carbobenzyloxyamino-$\omega$-carboxyalkylpenicillin with hydrogen in the presence of a palladium catalyst to remove the amino protecting group from carbobenzyloxyamino-$\omega$-carboxyalkylpenicillin, and (8) recovering the amino-$\omega$-carboxyalkylpenicillin so formed.

2. A process for the preparation of $\delta$-amino-$\delta$-carboxybutylpenicillin which comprises the steps of (1) contacting $\alpha$-aminoadipic acid with benzoxycarbonyl chloride, (2) isolating the $\alpha$-carbobenzyloxyaminoadipic acid so formed, (3) contacting the $\alpha$-carbobenzyloxyaminoadipic acid with a lower aliphatic ester of chlorocarbonic acid to form the corresponding anhydride, (4) isolating said anhydride so formed, (5) contacting said anhydride with 6-aminopenicillanic acid to form $\delta$-carbobenzyloxyamino-$\delta$-carboxybutylpenicillin, (6) isolating the $\delta$-carbobenzyloxyamino-$\delta$-carboxybutylpenicillin so formed, (7) contacting said penicillin with hydrogen in the presence of a palladium catalyst to remove amino protecting group from $\delta$-carbobenzyloxyamino-$\delta$-carboxybutylpenicillin, and (8) recovering the $\delta$-amino-$\delta$-carboxybutylpenicillin so formed.

3. A process for the preparation of an $\alpha$-amino-$\omega$-carboxyalylpenicillin which comprises the steps of (1) contacting an $\alpha$-amino-$\omega$-carboxyalkanoic acid containing an alkenyl group having from 3 to 6 carbon atoms with a compound selected from the group consisting of lower aliphatic esters of chlorocarbonic acid, an acid azide, and a lower alkyl monocarbodiimide to protect the amino group of said carboxyalkanoic acid, (2) contacting the protected α-amino-ω-carboxyalkanoic acid thus formed with a compound selected from the group consisting of a lower aliphatic ester of chlorocarbonic acid and a halogenating agent to introduce an acylating function in said carboxyalkanoic acid, (3) contacting the product formed by said last-named step with 6-aminopenicillanic acid to form the corresponding acylated 6-aminopenicillanic acid, (4) contacting said acylated 6-aminopenicillanic acid with hydrogen in the presence of a palladium catalyst to remove the protecting group from said amine, and (5) isolating the amino-ω-carboxyalkylpenicillin thus formed.

References Cited in the file of this patent

FOREIGN PATENTS 569,728    Belgium _____ Nov. 15, 1958

OTHER REFERENCES

Wertheim: Textbook of Organic Chemistry, pages 726–727, second edition (1945).

Bergmann: The Chemistry of Acetylene and Related Compounds, page 80, Interscience Publishers Inc., New York, New York, 1948.

UNITED STATES PATENT OFFICE
CERTIFICATE OF CORRECTION

Patent No. 3,078,268            February 19, 1963

Frank Peter Doyle et al.

It is hereby certified that error appears in the above numbered patent requiring correction and that the said Letters Patent should read as corrected below.

Column 1, line 13, for "feds" read -- feeds --; column 2, line 41, for "R″O.C-," read -- R″O.CO--, --; same line 41, for "alkyl" read -- allyl --; column 4, line 26, for "the" read -- then --; column 8, line 68, for "carboxyalylpenicillin" read -- carboxyalkylpenicillin --.

Signed and sealed this 1st day of October 1963.

(SEAL)
Attest:

ERNEST W. SWIDER

Attesting Officer

DAVID L. LADD

Commissioner of Patents